(12) United States Patent
Wang et al.

(10) Patent No.: US 8,160,661 B2
(45) Date of Patent: Apr. 17, 2012

(54) SLIDE MECHANISM FOR SLIDE-TYPE PORTABLE TERMINAL DEVICES

(75) Inventors: Jin-Xin Wang, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1059 days.

(21) Appl. No.: 12/054,359

(22) Filed: Mar. 24, 2008

(65) Prior Publication Data

US 2009/0149228 A1    Jun. 11, 2009

(30) Foreign Application Priority Data

Dec. 7, 2007   (CN) .......................... 2007 1 0202934

(51) Int. Cl.
*H04M 1/00* (2006.01)
(52) U.S. Cl. ..................... 455/575.4; 348/787; 348/788; 348/789
(58) Field of Classification Search .... 455/575.1–575.4; 348/787
See application file for complete search history.

(56) References Cited

U.S. PATENT DOCUMENTS

| | | | | |
|---|---|---|---|---|
| 7,269,451 | B2 * | 9/2007 | Kwon | 455/575.4 |
| 7,515,930 | B2 * | 4/2009 | Eromaki | 455/550.1 |
| 7,672,699 | B2 * | 3/2010 | Kim et al. | 455/575.4 |
| 7,831,286 | B2 * | 11/2010 | Cho et al. | 455/575.4 |
| 2006/0032279 | A1 * | 2/2006 | Andersen | 70/395 |
| 2007/0091582 | A1 * | 4/2007 | Ku et al. | 361/814 |
| 2007/0270198 | A1 * | 11/2007 | Maatta | 455/575.3 |
| 2008/0058034 | A1 * | 3/2008 | Lu et al. | 455/575.1 |
| 2008/0119250 | A1 * | 5/2008 | Cho et al. | 455/575.4 |
| 2008/0261659 | A1 * | 10/2008 | Jang et al. | 455/566 |

FOREIGN PATENT DOCUMENTS

| | | |
|---|---|---|
| CN | 1839553 A | 9/2006 |
| KR | 20060056022 A | 5/2006 |
| TW | I271087 | 1/2007 |

* cited by examiner

*Primary Examiner* — Marcos Batista
(74) *Attorney, Agent, or Firm* — Altis Law Group, Inc.

(57) ABSTRACT

An exemplary slide mechanism (100) includes a rear cover (10), a front cover (20), and a magnetic assembly (80) connected to the rear cover and the front cover. The front cover is slidably attached to the rear cover. Each of the at least one magnetic assembly includes a first magnetic member (44) and a second magnetic member (74). A magnetic force created between the first and second magnetic members forces the front cover sliding relative to the rear cover. The magnetic members are arranged such that the height of the space occupied by the magnetic members is less than an arithmetic sum of the height of each of the magnetic members.

16 Claims, 6 Drawing Sheets

SLIDE MECHANISM FOR SLIDE-TYPE PORTABLE TERMINAL DEVICES

BACKGROUND OF THE INVENTION

1. Field of the Invention

The present invention relates to slide mechanisms, and more particularly to a slide mechanism for a slide-type portable terminal device which constitutes a first housing and a second housing slidably coupled to each other.

2. Discussion of the Related Art

Slide-type portable terminal devices, for example slide-type mobile phones are popular. The slide-type portable terminal usually has two housings. One housing slides over the other housing, thereby opening or closing the portable terminal device.

Referring to FIG. 6, a typical slide mechanism includes a first sheet 50 and a second sheet 60. The sheets 50, 60 are fixed on a main unit and a display unit, correspondingly, of a slide-type portable terminal device. Two blocking slots 53 are defined adjacent to one end of the first sheet 50, and two blocking protrusions 63 for engaging in the blocking slots 53 are formed adjacent to one end of the second sheet 60. Two first magnets 55 are disposed at a middle portion of the first sheet 50, and two second magnets 65 are disposed at a middle portion of the second sheet 60. The magnets 55, 65 are arranged such that when the magnets 55, 65 are close to each other, a repulsive magnetic force is created between them. The first sheet 50 is slidably attached to the second sheet 60. When the display unit is in a closed position, the first sheet 50 is positioned at one end opposite to the blocking protrusions 63 of the second sheet 60. When the display unit is slid opened from the main unit, the first sheet 50 moves along a direction of the arrow shown in FIG. 6 until the blocking slots 53 engaging with the blocking protrusions 63. During this process, the first magnets 55 of the first sheet 50 moves toward the second magnets 65 as a result the repulsive magnetic force between the magnets 55, 65 pushes the first sheet 50 to continue to move. An engagement of the blocking slots 53 and the blocking protrusions 63 makes the first sheet 40 positioned at a predetermined position.

The slide mechanism includes the magnets 55, 65 disposed at surfaces of the sheets 50, 60 correspondingly. When the first sheet 50 slides to a predetermined position, the magnets 55, 65 are stacked together. Thus, the slide mechanism is relatively thick. In such a case, a portable terminal device adopting the slide mechanism has a large thickness. However, portable terminal devices are usually required to be light and thin.

Therefore, a slide mechanism which overcomes the above-described shortcomings is desired.

SUMMARY

An exemplary slide mechanism includes a rear cover, a front cover, and a magnetic assembly connected to the rear cover and the front cover. The front cover is slidably attached to the rear cover. Each of the at least one magnetic assembly includes a first magnetic member and a second magnetic member. A magnetic force created between the first and second magnetic members forces the front cover to slide relative to the rear cover. The magnetic members are arranged such that the height of the space occupied by the magnetic members is less than an arithmetic sum of the height of each of the magnetic members.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the slide mechanism. Moreover, in the drawings, like reference numerals designate corresponding parts throughout the several views.

DETAILED DESCRIPTION OF THE EMBODIMENTS

Figure 1:
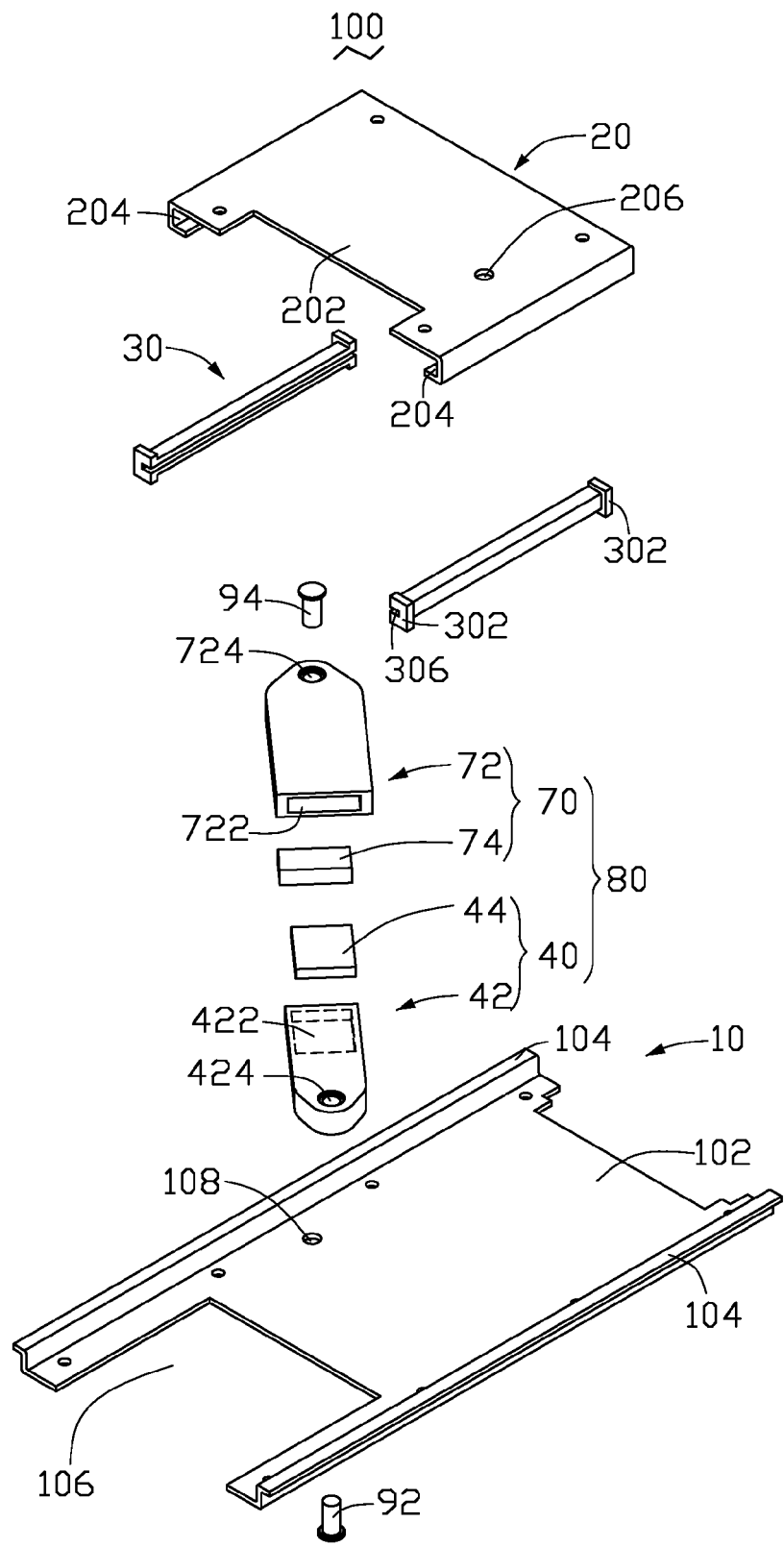
FIG. 1 is an exploded, isometric view of a slide mechanism in accordance with a first embodiment of the present invention.

Referring to the drawings in detail, FIG. 1 shows a slide mechanism 100 of a preferred embodiment of the present invention. The slide mechanism 100 includes a rear cover 10, a front cover 20, two guiding rails 30, a first rotatable arm 42, a first magnetic member 44 received in the first arm 42, a second rotatable arm 72, and a second magnetic member 74 received in the second arm 72.

The rear cover 10 is substantially a flat sheet having a main plate 102 and two side strips 104 formed at opposite sides of the main plate 102. The side strips 104 extend along the sides of the main plate 102 correspondingly. The main plate 102 further defines a cutout 106 at a distal end and a circular pinhole 108 in a middle portion of the main plate 102. The pinhole 108 is adjacent to one of the side strips 104.

The front cover 20 is substantially a flat sheet having a base 202 and defines two sliding grooves 204 at opposite ends of the base 202. The sliding grooves 204 are configured for engaging with the side strips 104 correspondingly. The front cover 20 defines a pinhole 206 adjacent to one of the sliding grooves 204. When the front cover 20 is coupled to the rear cover 10, the pinhole 108 of the rear cover 10 and the pinhole 206 of the front cover 20 are positioned at opposite sides of the slide mechanism 100 correspondingly.

Each of the guiding rails 30 is substantially an elongated bar. A pair of projections 302 are formed at opposite ends of each of the guiding rails 30. Each of the guiding rails 30 further defines a guiding groove 306. The guiding grooves 306 are configured for engaging with the side strips 104 correspondingly. In other words, the guiding rails 30 can slidably engage with the rear cover 10. The guiding rails 30 are securely received in the sliding grooves 204 correspondingly.

The first rotatable arm 42 defines a receptacle 422. The receptacle 422 is configured for receiving the first magnetic member 44. The first rotatable arm 42 further defines a pivot hole 424. The first rotatable arm 42 is rotatably mounted to the front cover 20 at the pivot hole 424 via a pivot pin 92.

The second rotatable arm 72 defines a receiving slot 722. The receiving slot 722 is configured for receiving the second magnetic member 74 and slidably receiving the first rotatable arm 42. The second rotatable arm 72 further defines a pivot hole 724. The second rotatable arm 72 is rotatably mounted to the rear cover 10 at the pivot hole 724 via a pivot pin 94.

To assemble the slide mechanism 100, the first magnetic member 44 is secured in the receptacle 424 of the first rotatable arm 42, thereby forming a first magnetic unit 40. The second magnetic member 74 is secured in the receiving slot 722 of the second rotatable arm 72, thereby forming a second magnetic unit 70. The first magnetic unit 40 is partially inserted into the receiving slot 722 of the second rotatable arm 72, thereby forming a magnetic assembly 80. In the magnetic assembly 80, ends of the magnetic members 44, 74 facing each other have a same polarity. The pivot pin 92 is inserted through the pivot hole 424 and fixed to the pinhole 206 so as to rotatably connect the first magnetic unit 40 to the front cover 20. The guiding rails 30 are fixed to and received in the sliding grooves 204 of the front cover 20 correspondingly. The side strips 104 are received in the guiding grooves 306 correspondingly, thereby slidably mounting the front cover 20 and the guiding rails 30 to the rear cover 10. Finally, the pivot pin 94 is inserted through the pivot hole 724 and fixed to the pinhole 108 so as to rotatably connect the second magnetic unit 70 to the rear cover 10.

In the preferred embodiment, the first magnetic member 44 and the second magnetic member 74 have a same thickness. Furthermore, the magnetic members 44, 74 lie on the same plane or partially offset each other, in other words, the magnetic members 44, 74 are arranged such that the height of the space occupied by the magnetic members 44, 74 is less than an arithmetic sum of the height of each of the magnetic members 44, 74. The magnetic members 44, 74 are preferred to lie on the same plane.

Figure 2:
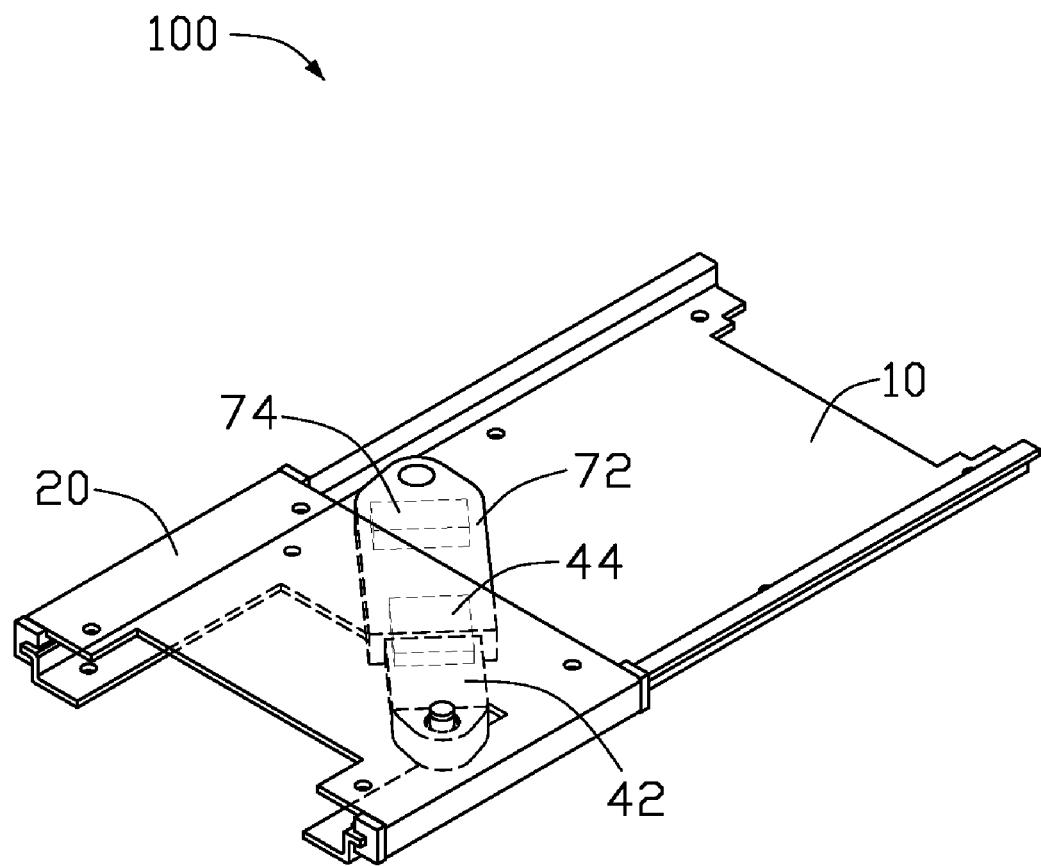
FIG. 2 is an assembled, isometric view of the slide mechanism of FIG. 1, showing a closed state of the slide mechanism.
Figure 3:
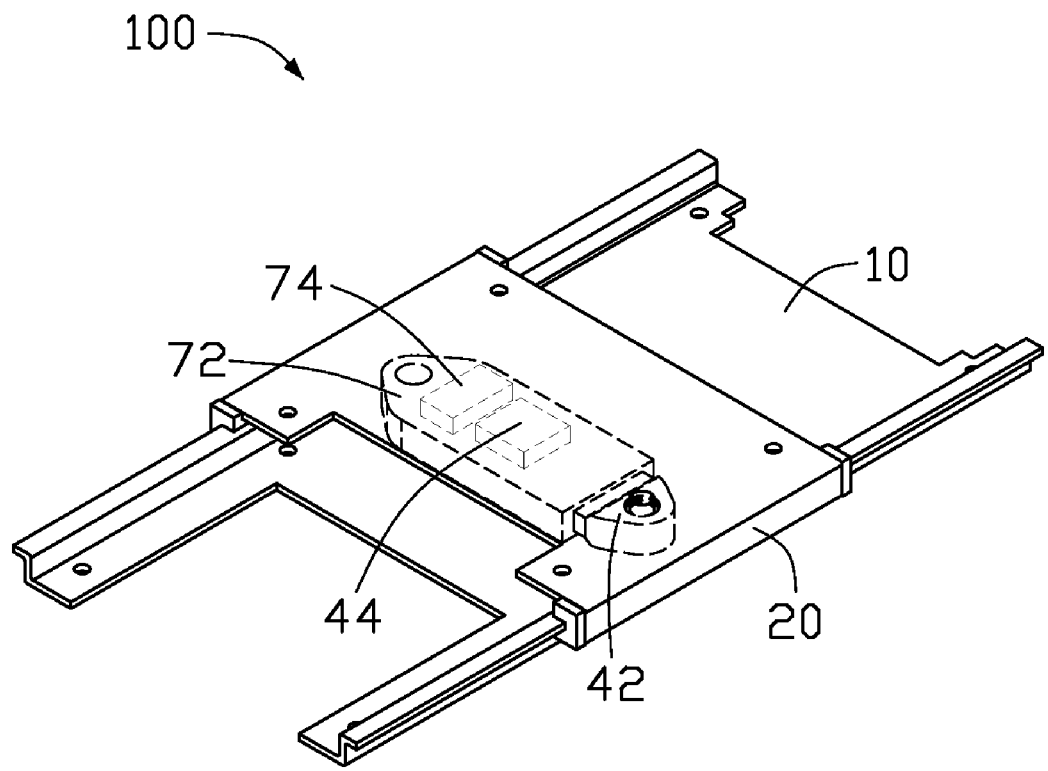
FIG. 3 is an assembled, isometric view of the slide mechanism of FIG. 1, showing a middle state of the slide mechanism.
Figure 4:
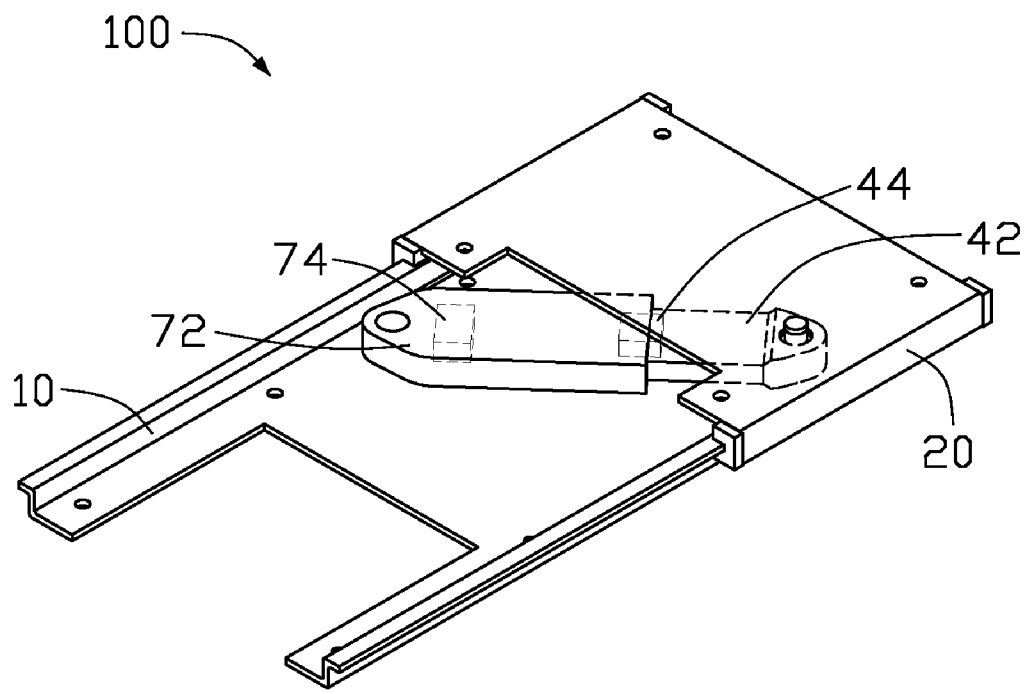
FIG. 4 is an assembled, isometric view of the slide mechanism of FIG. 1, showing an open state of the slide mechanism.

In use, referring to FIGS. 2 through 4, a working process is shown. When the slide mechanism 100 is in a closed position, referring to FIG. 2, the front cover 20 is positioned at a first end of the rear cover 10, and the first magnetic unit 40 is partially received in the second magnetic unit 70. A distance between the magnetic members 44, 74 is at a largest distance when in the closed position. To change from the closed position to an opened position, the front cover 20 is manually moved from the first end to the second end of the rear cover 10. When moving, the pivot arms 42, 72 rotates around the pivot pins 92, 94 correspondingly, as a result, the first magnetic unit 40 slides deeper into the second magnetic unit 70, the distance between the magnetic members 44, 74 decreases, and a repulsive magnetic force increases. Referring to FIG. 3, when the front cover 20 slides to a halfway position, the distance between the magnetic members 44, 74 is at a smallest distance and the repulsive magnetic force is greatest than in any other positions. When the front cover 20 moves pass the halfway position from the closed position, the manual force can be released (discontinued), the repulsive magnetic force pushes the pivot arms 42, 72 away from each other, thereby driving the front cover 20 to automatically move to the second end of the rear cover 10. When the front cover 20 moves to the second end of the rear cover 10, the slide mechanism 100 is in an opened state as to slide until the rear cover 10 is in an open position shown in FIG. 4. At the moment, the slide mechanism 100 is fully opened. To change from the opened position to the closed position, the front cover 20 is moved from the second end towards the first end of the rear cover 10. The process of closing the front cover 20 and the above-described opening process are substantially in the same manner.

When opening or closing the front cover 20 along the rear cover 10, the magnetic members 44, 74 lies in a same plane. Therefore, the slide mechanism 100 is relatively thin. In addition, because the magnetic members 44, 74 are correspondingly inserted into the rotatable arms 42, 74, thus forming the first magnetic unit 40 and the second magnetic unit 70. The first magnetic unit 40 is partially received in the second magnetic unit 70 to form the magnetic assembly 80. Two components, such as the front cover 20 and the rear cover 10, can be slidably attached to each other by assembling the magnetic assembly 80 to the components via rivets. This magnetic assembly 80 can be considered as a modular assembly and will enhance manufacturing processing.

Alternatively, the rotatable arms 42, 72 may be connected to the front cover 20 and the rear cover 10 by other fastening members such as bolts. A locking member for engaging with the first rotatable arm 42 may be formed on the second rotatable arm 72 so that the first rotatable arm 42 cannot slide away from the second rotatable arm 72.

Figure 5:
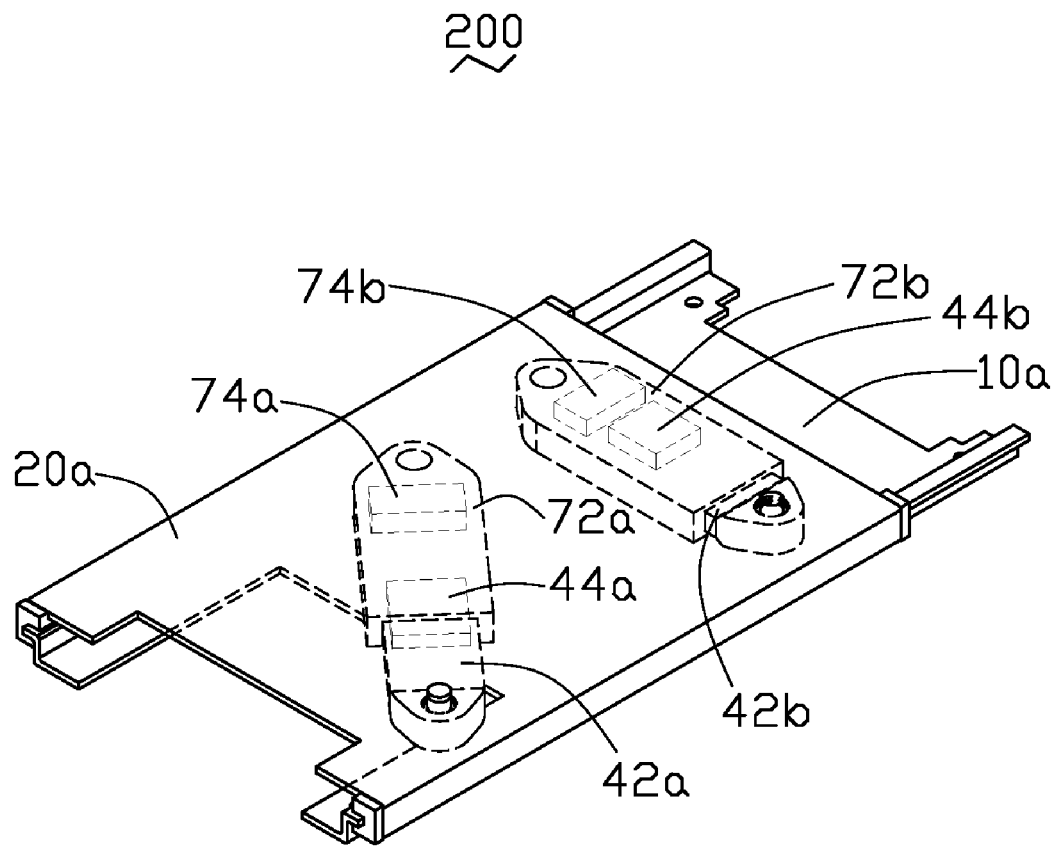
FIG. 5 is an assembled, isometric view of a slide mechanism in accordance with a second embodiment of the present invention.
Figure 6:
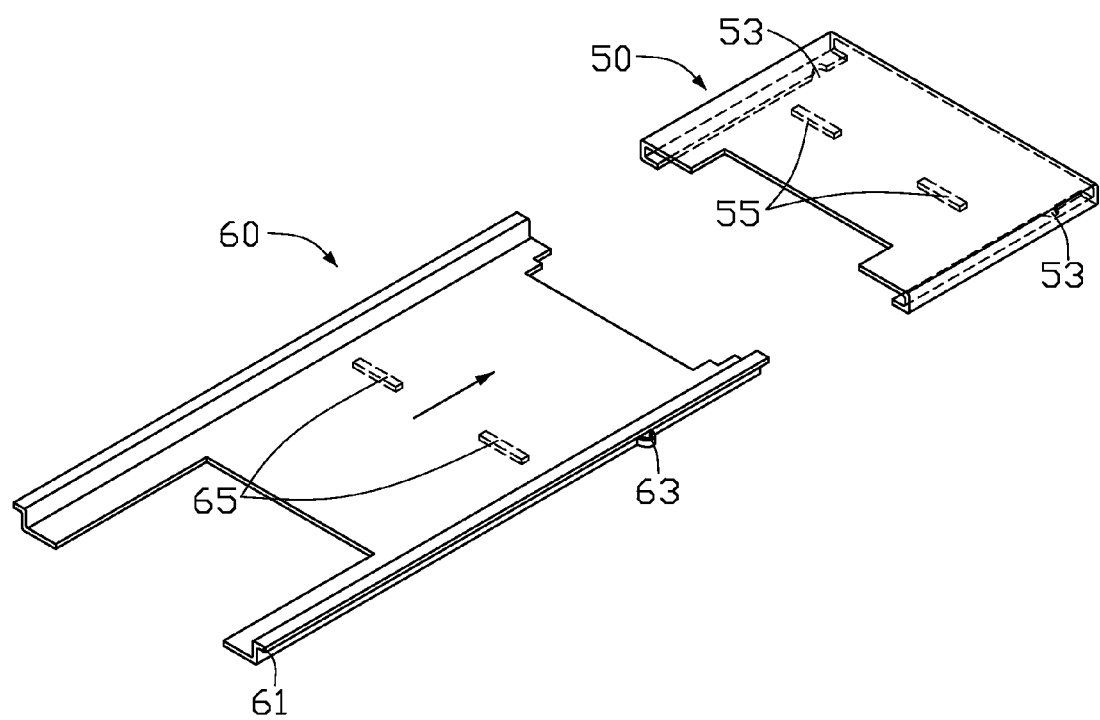
FIG. 6 is an exploded, isometric view of a conventional slide mechanism.

Referring to FIG. 5, a slide mechanism 200 of a second embodiment is similar to the slide mechanism 100 of the above-described embodiment, except that a front cover 20a is forced to slide relative to the rear cover 10a by a magnetic attracting force generated by two magnetic members 44a, 74a (44b, 74b) with different polarities facing each other. Detailedly described, the slide mechanism 200 includes a first magnetic assembly (not labeled) and a second magnetic assembly (not labeled). The magnetic assemblies are similar to the magnetic assembly 80 of the slide mechanism 100 except that ends of the magnetic members 44a, 74a (44b, 74b) facing each other have different polarities. Two ends of each of the magnetic assemblies are correspondingly connected to the rear cover 10a and the front cover 20a. The magnetic members 44a, 44b are correspondingly secured in receptacles of rotatable arms 42a, 42b. The magnetic members 74a, 74b are correspondingly secured in receiving slots of rotatable arms 72a, 72b. The rotatable arms 42a, 42b are partially inserted into the receiving slots of the rotatable arms 72a, 72b correspondingly, thereby forming the magnetic assemblies.

When the slide mechanism 200 of the second embodiment is in a closed state, a distance between the magnetic members 44b, 74b of the first magnetic assembly is at a smallest distance, and a distance between the magnetic members 44a, 74a of the second magnetic assembly is at a largest distance. In the closed state, the front cover 20a is positioned at the closed position relative to the rear cover 10a by the magnetic attracting force of the first magnetic assembly. When the slide mechanism 200 is pushed to an open state, the distance between the magnetic members 44b, 74b of the first magnetic assembly is at a largest distance, and the distance between the magnetic members 44a, 74a of the second magnetic assembly is at a smallest distance. In the open state, the front cover 20a positioned at the closed position relative to the rear cover 10a by the magnetic attracting force of the second magnetic assembly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A slide mechanism, comprising:
   a rear cover;
   a front cover slidably attached to the rear cover; and at least one magnetic assembly connected to the rear cover and the front cover, each of the at least one magnetic assembly including a first magnetic member and a second magnetic member, wherein a magnetic force created between the first and second magnetic members forces the front cover to slide relative to the rear cover, and the magnetic members are arranged such that the height of the space occupied by the magnetic members is less than an arithmetic sum of the height of each of the magnetic members, each of the at least one magnetic assembly further comprises a first rotatable arm and a second rotatable arm, the first magnetic member is received in the first rotatable arm to form a first magnetic unit, the second magnetic member is received in the second rotatable arm to form a second magnetic unit, and the first magnetic unit is partially received in the second rotatable arm and is slidable relative to the second magnetic unit.

2. The slide mechanism as claimed in claim 1, wherein the magnetic force is a repulsive magnetic force, and the slide mechanism comprises one magnetic assembly.

3. The slide mechanism as claimed in claim 2, wherein a distance between the first and second magnetic members is at a largest distance when the slide mechanism is in a closed or an open state, and the distance between the first and second magnetic members is at a smallest distance when the slide mechanism is in a halfway state.

4. The slide mechanism as claimed in claim 1, wherein the magnetic force is a magnetic attracting force, and the slide mechanism comprises a first magnetic assembly and a second magnetic assembly.

5. The slide mechanism as claimed in claim 4, wherein, a distance between the first and second magnetic members of the first magnetic assembly is at a smallest distance, and a distance between the first and second magnetic members of the second magnetic assembly is at a largest distance when the slide mechanism is in a closed state, the distance between the first and second magnetic members of the first magnetic assembly is at a largest distance, and the distance between the first and second magnetic members of the second magnetic assembly is at a smallest distance when the slide mechanism is pushed to an open state.

6. The slide mechanism as claimed in claim 1, wherein the first rotatable arm defines a receptacle therein, the first magnetic member is securely received in the receptacle, the second rotatable arm defines a receiving slot therein, the second magnetic member is securely received in the receiving slot, and the first magnetic unit is slidably received in the receiving slot.

7. The slide mechanism as claimed in claim 6, further comprising two guiding rails for connecting the front cover and the rear cover, wherein the front cover defines two sliding grooves therein, the two guiding rails are correspondingly fixed and received in the two sliding grooves, the rear cover has two side strips formed at two opposite ends thereof, each the guiding rail defines a guiding groove therein, and each guiding rail is configured for engaging with one side strip, such that the guiding rails slidably engage with the rear cover.

8. The slide mechanism as claimed in claim 1, wherein the central cross-sections of the first and second magnetic members of each magnetic assembly lie on the same plane.

9. A slide mechanism comprising:
a first component;
a second component slidably attached to the first component; and
at least one magnetic assembly connected to the first component and the second component, each of the at least one magnetic assembly including a first magnetic member and a second magnetic member, wherein a magnetic force generated between the first and second magnetic members forces the second component sliding relative to the first component, and at least part of the first and second magnetic members of each magnetic assembly in a direction perpendicular to a sliding direction of the second component are in a same plane, each magnetic assembly further comprises a first rotatable arm and a second rotatable arm, the first magnetic member is received in the first rotatable arm to form a first magnetic unit, the second magnetic member is received in the second rotatable arm to form a second magnetic unit, and the first magnetic unit is partially received in the second rotatable arm and is slidable relative to the second magnetic unit.

10. The slide mechanism as claimed in claim 9, wherein the magnetic force is a repulsive magnetic force, and the slide mechanism comprises one magnetic assembly.

11. The slide mechanism as claimed in claim 10, wherein a distance between the first and second magnetic members is at a largest distance when the slide mechanism is in a closed or an open state, and the distance between the first and second magnetic members is at a smallest distance when the slide mechanism is in a halfway state.

12. The slide mechanism as claimed in claim 9, wherein the magnetic force is a magnetic attracting force, and the slide mechanism comprises a first magnetic assembly and a second magnetic assembly.

13. The slide mechanism as claimed in claim 12, wherein a distance between the first and second magnetic members of the first magnetic assembly is at a smallest distance, and a distance between the first and second magnetic members of the second magnetic assembly is at a largest distance when the slide mechanism is in a closed state, the distance between the first and second magnetic members of the first magnetic assembly is at a largest distance, and the distance between the first and second magnetic members of the second magnetic assembly is at a smallest distance when the slide mechanism is pushed to an open state.

14. The slide mechanism as claimed in claim 9, wherein the first rotatable arm defines a receptacle therein, the first magnetic member is securely received in the receptacle, the second rotatable arm defines a receiving slot therein, the second magnetic member is securely received in the receiving slot, and the first magnetic unit is slidably received in the receiving slot.

15. The slide mechanism as claimed in claim 14, further comprising two guiding rails for connecting the second component and the first component, the second component has two sliding grooves, the two guiding rails are correspondingly fixed and received in the two sliding grooves, the first component has two side strips formed at two opposite ends thereof, each the guiding rail defines a guiding groove therein, each guiding rail is configured for engaging with one side strip, such that the guiding rails slidably engage with the first component.

16. The slide mechanism as claimed in claim 9, wherein the first and second magnetic members have same thicknesses, top surfaces parallel to the sliding direction of the second component of the first and second magnetic members are in a same plane, and bottom surfaces parallel to the sliding direction of the second component of the first and second magnetic members are in a same plane.

* * * * *